United States Patent
Woo et al.

(10) Patent No.: US 11,834,101 B2
(45) Date of Patent: Dec. 5, 2023

(54) COUPLING STRUCTURE OF VEHICLE BODY AND CHASSIS FRAME

(71) Applicant: HYUNDAI MOBIS CO., LTD., Seoul (KR)

(72) Inventors: Hyun Jin Woo, Yongin-si (KR); Hyoun Young Oh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 128 days.

(21) Appl. No.: 17/468,236

(22) Filed: Sep. 7, 2021

(65) Prior Publication Data

US 2022/0073143 A1 Mar. 10, 2022

(30) Foreign Application Priority Data

Sep. 7, 2020 (KR) .......................... 10-2020-0113673

(51) Int. Cl.
*B62D 24/00* (2006.01)

(52) U.S. Cl.
CPC .................................. *B62D 24/00* (2013.01)

(58) Field of Classification Search
CPC .. B62D 24/00; B62D 25/025; B62D 25/2036; B62D 25/2009; B60K 2001/0438; B60Y 2306/01
USPC ........................................................ 296/209
See application file for complete search history.

(56) References Cited

U.S. PATENT DOCUMENTS

| | | | | |
|---|---|---|---|---|
| 2013/0206496 A1* | 8/2013 | Hashimoto | ............ | B62D 21/12 180/291 |
| 2013/0249203 A1* | 9/2013 | Jung | .................... | B62D 31/003 280/785 |
| 2020/0114972 A1* | 4/2020 | Lee | ....................... | B62D 29/005 |
| 2021/0237550 A1* | 8/2021 | Kawase | ................ | B60L 3/0007 |

FOREIGN PATENT DOCUMENTS

| CN | 206417082 U | * 8/2017 | ............... B60K 1/04 |
|---|---|---|---|
| KR | 10-2009-0109752 A | 10/2009 | |

* cited by examiner

*Primary Examiner* — Amy R Weisberg
*Assistant Examiner* — Sara Laghlam
(74) *Attorney, Agent, or Firm* — Morgan, Lewis & Bockius LLP (57) ABSTRACT

A coupling structure of a vehicle body and a chassis frame may include: a vehicle body side sill section provided to the vehicle body of a vehicle; and a side member section provided to a chassis frame coupled to the vehicle body, coupled to the vehicle body side sill section, and having a battery module mounted thereto, wherein the side member section includes a side member body part, and a battery coupling part which is integrally formed with the side member body part, wherein the vehicle body side sill section includes a side sill body part which is seated on the upper surface of the side member body part, and a locking part which is integrally formed with the side sill body part.

7 Claims, 7 Drawing Sheets

COUPLING STRUCTURE OF VEHICLE BODY AND CHASSIS FRAME

CROSS-REFERENCE TO RELATED APPLICATION

This application claims the benefit under 35 U.S.C. § 119(a) of Korean Patent Application No. 10-2020-0113673, filed on Sep. 7, 2020 in the Korean Intellectual Property Office, the entire disclosure of which is incorporated herein by reference for all purposes.

BACKGROUND

Technical Field

Exemplary embodiments of the present disclosure relate to a coupling structure of a vehicle body and a chassis frame, and more particularly, to a coupling structure of a vehicle body and a chassis frame, which improves collision performance of a vehicle and increases rigidity of the vehicle.

Discussion of the Background

In general, an electric vehicle, as a vehicle powered by electricity, refers to a vehicle which obtains driving energy by rotating a motor with electricity accumulated in a battery rather than through combustion of fossil fuel.

The electric vehicle does not use fossil fuel during driving, and thus, is eco-friendly by not emitting carbon dioxide or nitrogen oxide. When the electric vehicle is driven only by an electric motor, economic efficiency thereof is increased because the driving cost is substantially lowest.

In such an electric vehicle, a battery is detachably installed under the body of the vehicle, and a front wheel chassis module and a rear wheel chassis module, on which the wheels of the vehicle are installed, are also installed under the body of the vehicle.

Figure 7:
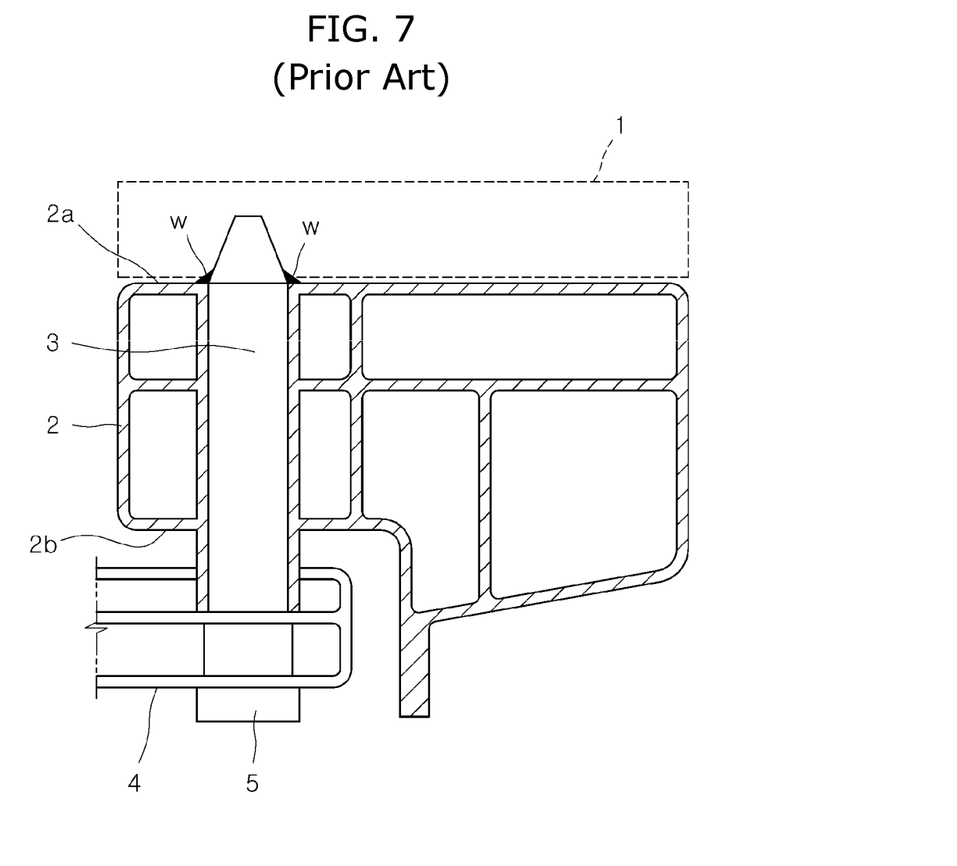
FIG. 7 is a cross-sectional view illustrating a conventional side member.

The battery may be assembled to a chassis frame, and the chassis frame may be coupled to the body of the vehicle. FIG. 7 illustrates a coupling structure of a side member 2 of a conventional chassis frame and a side sill 1 provided to the body of a vehicle.

Referring to FIG. 7, in order to fasten a battery to the vehicle, a locking bolt 5 may be locked to the side sill 1 by passing through a battery mounting part 4 and the side member 2. To this end, the side member 2 may be provided with a bolt passage pipe 3 through which the locking bolt 5 passes, and the bolt passage pipe 3 may be fastened by welding in a state in which the bolt passage pipe 3 passes through the side member 2.

However, in a process of welding the bolt passage pipe 3 to the side member 2, when the bolt passage pipe 3 is welded to a vehicle body seating surface 2a and a battery mounting surface 2b of the side member 2, a problem may be caused in that it is difficult to realize a flat surface due to the presence of a weld bead W. Also, since the side member 2 is fabricated using an extruded material which forms a closed sectional shape, it is difficult to perform welding on an inner part of the side member 2.

Therefore, there is a need to improve each of the side member 2 and the side sill 1 so as to easily weld the bolt passage pipe 3 to the side member 2 and secure the coupling strength between the side member 2 and the side sill 1.

A background art of the present disclosure is disclosed in Korean Patent Application Publication No. 2009-0109752 (published on Oct. 21, 2009 and entitled "Chassis Frame of Vehicle").

SUMMARY

Various embodiments are directed to a coupling structure of a vehicle body and a chassis frame, which improves the shape of a side member section, thereby securing a welding space for welding a locking pipe.

Also, various embodiments are directed to a coupling structure of a vehicle body and a chassis frame, which improves the shape of a vehicle body side sill section to increase the contact area between a side member section and the vehicle body side sill section and increase a cross-sectional area in a coupling region, thereby increasing the torsional rigidity and bending rigidity of an entire vehicle.

In an embodiment, a coupling structure of a vehicle body and a chassis frame may include: a vehicle body side sill section provided to the vehicle body of a vehicle; and a side member section provided to a chassis frame coupled to the vehicle body, coupled to the vehicle body side sill section, and having a battery module mounted thereto, wherein the side member section includes a side member body part, and a battery coupling part which is integrally formed with the side member body part, through which a locking pipe for locking the battery module passes and of which an upper surface facing the vehicle body side sill section is formed at a height lower than an upper surface of the side member body part, and wherein the vehicle body side sill section includes a side sill body part which is seated on the upper surface of the side member body part, and a locking part which is integrally formed with the side sill body part and is provided with a locking nut part for locking a locking member passing through the locking pipe and of which a lower surface facing the side member section to be seated on the battery coupling part is formed at a height lower than a lower surface of the side sill body part.

The side member body part may include a first seating surface as a surface facing the vehicle body side sill section, and the battery coupling part may include a second seating surface through which the locking pipe passes and which is formed at a height lower than the first seating surface.

The side sill body part may include a first adhesion surface which is provided toward the side member section and is brought into contact with the first seating surface, and the locking part may include a second adhesion surface which is formed at a height lower than the first adhesion surface and is brought into contact with the second seating surface.

The side member body part may further include a vertical seating surface which is provided between the first seating surface and the second seating surface and extends perpendicularly to the first seating surface, and the locking part may further include a vertical adhesion surface which is provided between the first adhesion surface and the second adhesion surface and extends perpendicularly to the second adhesion surface.

The coupling structure may further include: an adhesion section formed by applying an adhesive between the vehicle body side sill section and the side member section, wherein the adhesion section includes: a first adhesion part formed between the first seating surface and the first adhesion surface; a second adhesion part formed between the second seating surface and the second adhesion surface; and a third adhesion part formed between the vertical seating surface and the vertical adhesion surface.

An upper end of the locking pipe may be formed to protrude out of the first adhesion surface, and the locking part may further include a pipe passage hole which is formed through the second adhesion surface to allow the locking pipe to pass therethrough.

The pipe passage hole may be formed to have a size larger than an outer diameter of the locking pipe.

According to the embodiments of the present disclosure, by improving the shape of a side member section, it is possible to secure a welding space for welding a locking pipe.

Also, according to the embodiments of the present disclosure, by improving the shape of a vehicle body side sill section, it is possible to increase the contact area between the side member section and the vehicle body side sill section and increase a cross-sectional area in a coupling region. As a consequence, the torsional rigidity and bending rigidity of an entire vehicle may be increased, and thus, collision performance may be improved.

DETAILED DESCRIPTION OF THE ILLUSTRATED EMBODIMENTS

Hereafter, embodiments of the present disclosure will be described in detail with reference to the accompanying drawings.

The following embodiments are embodiments suitable for promoting understandings of the technical features of a coupling structure of a vehicle body and a chassis frame in accordance with the present disclosure. However, the present disclosure is not limited to the following embodiments, the technical features of the present disclosure are not limited by the following embodiments, and the present disclosure can be modified in various manners without departing from the scope of the present disclosure.

Figure 1:
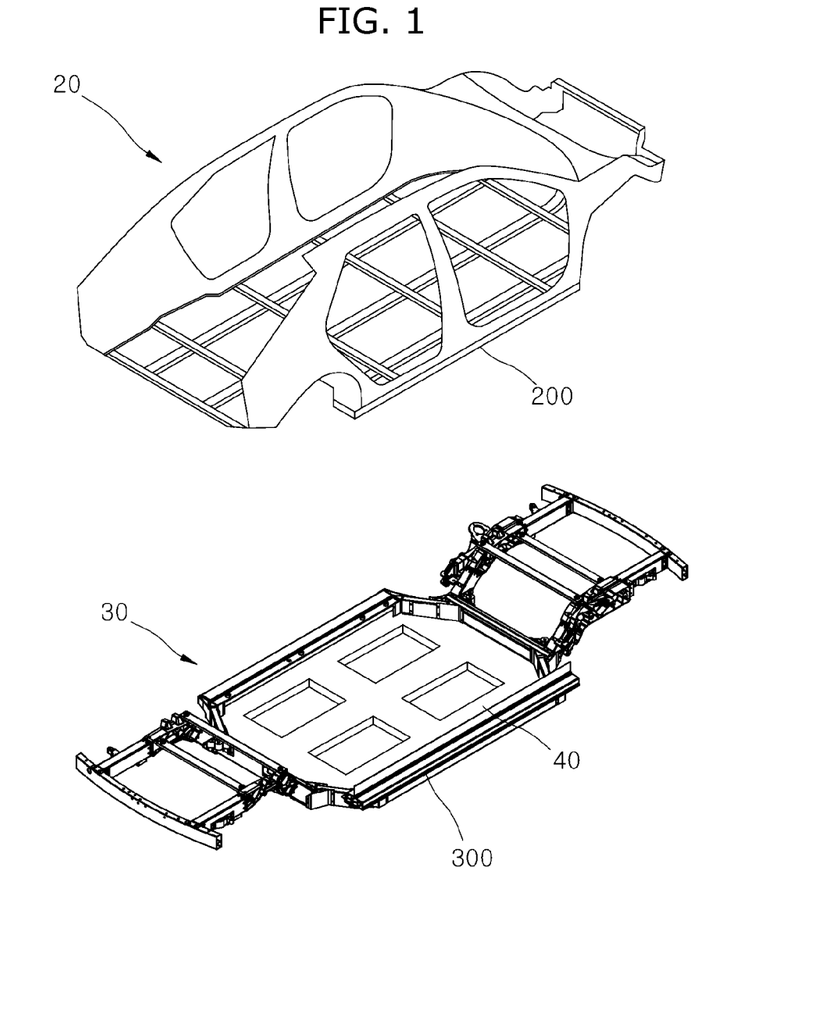
FIG. 1 is a perspective view illustrating a vehicle body and a chassis frame to which a coupling structure of a vehicle body and a chassis frame in accordance with an embodiment of the present disclosure is applied.
Figure 2:
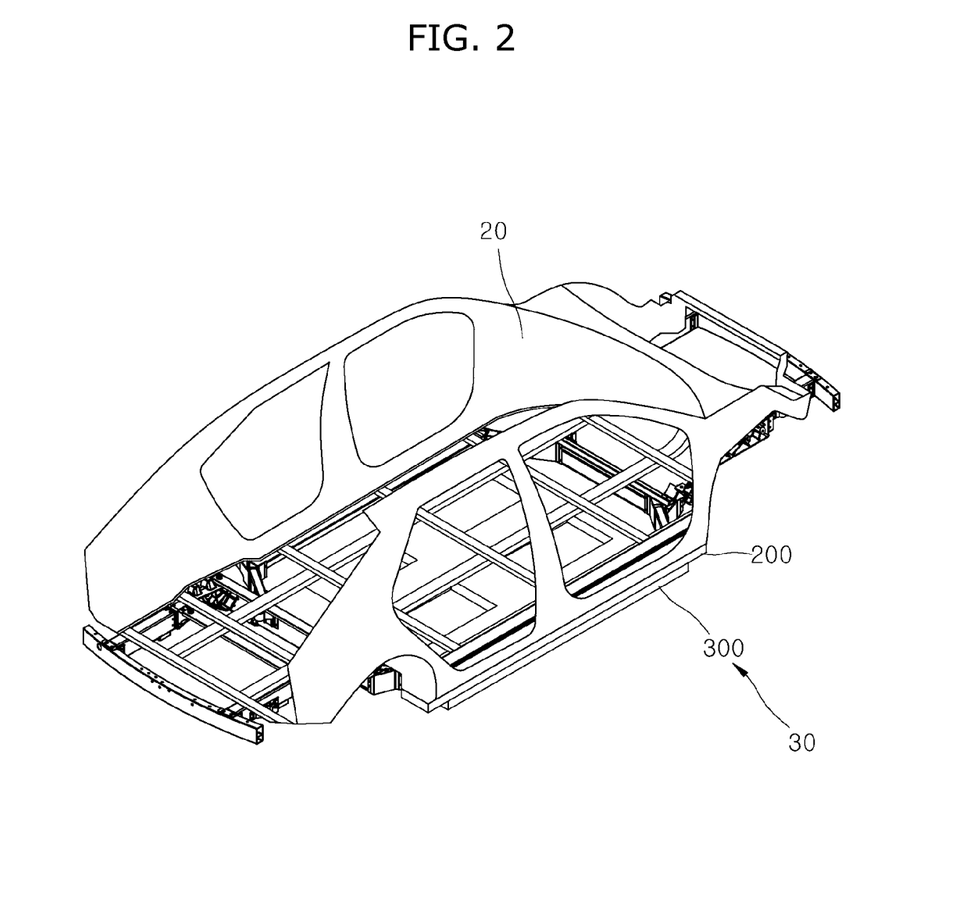
FIG. 2 is a perspective view illustrating a state in which the vehicle body and the chassis frame of FIG. 1 are coupled to each other.
Figure 3:
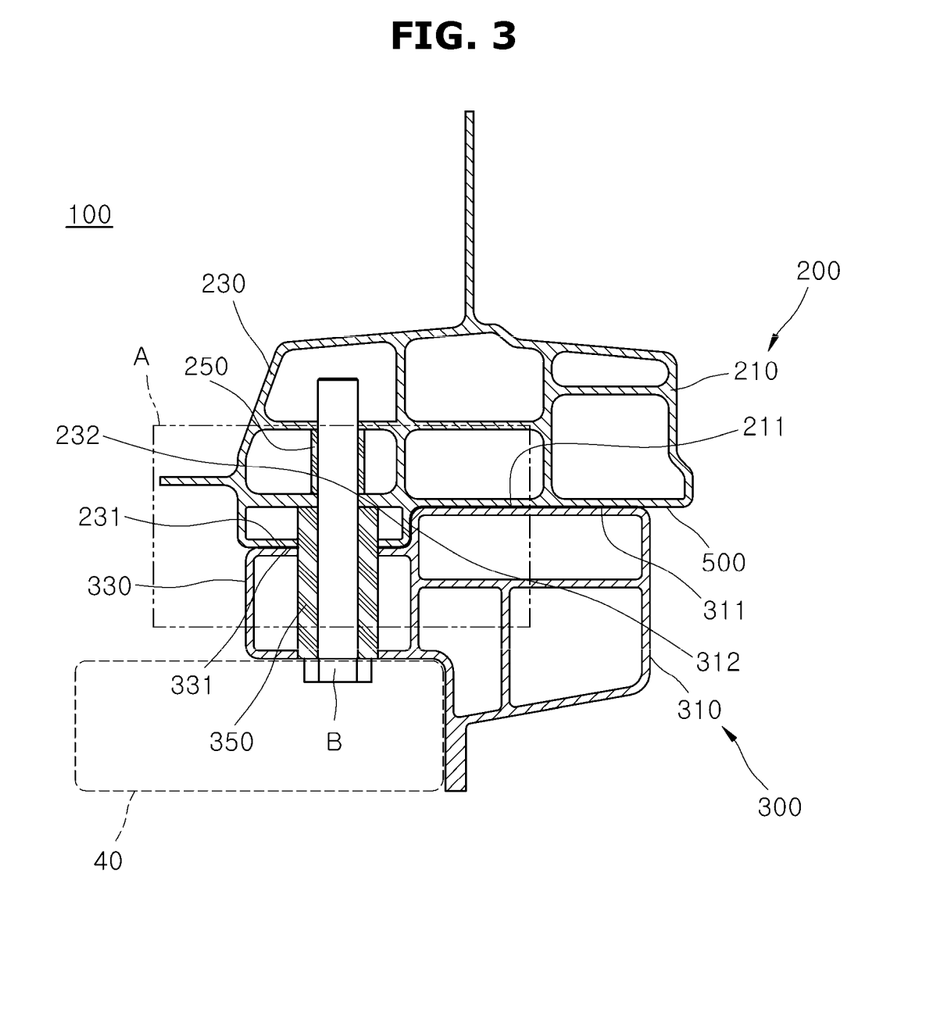
FIG. 3 is a cross-sectional view illustrating the coupling structure of a vehicle body and a chassis frame in accordance with the embodiment of the present disclosure.
Figure 4:
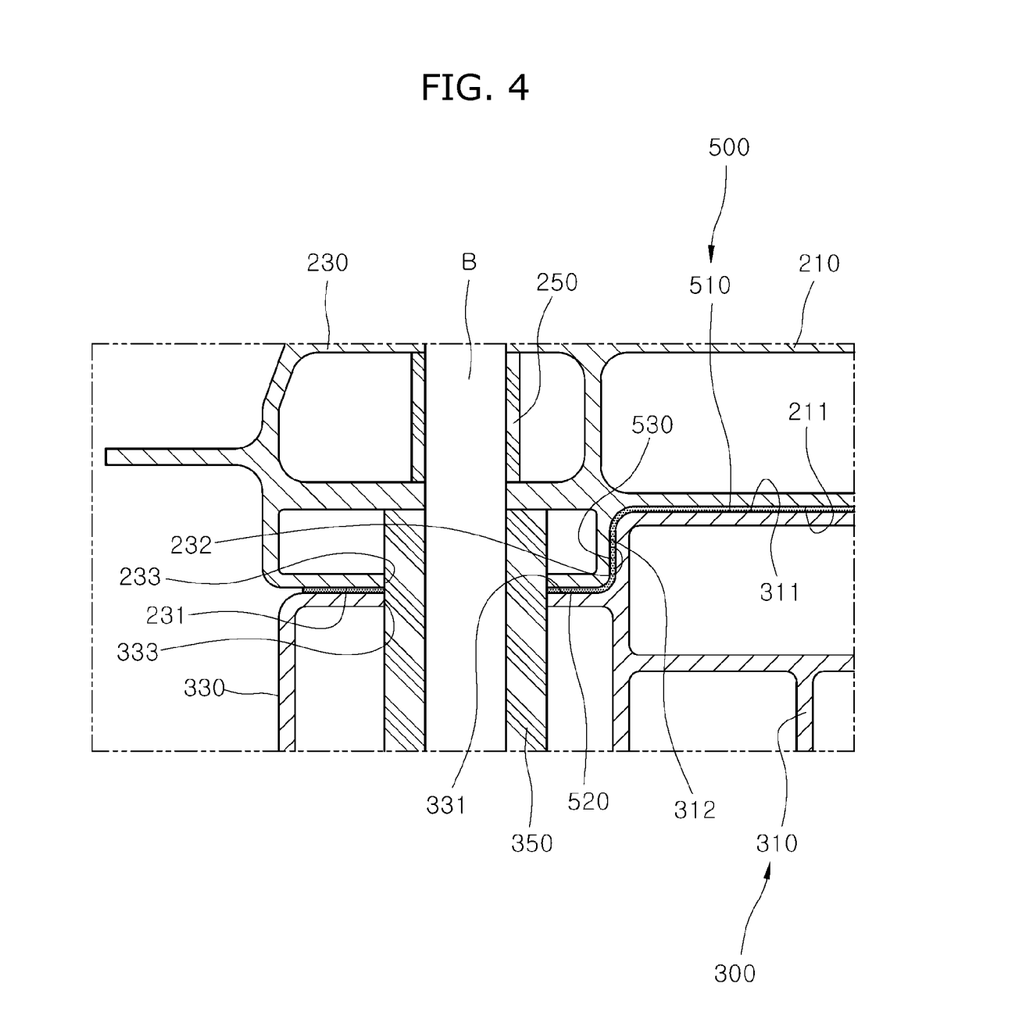
FIG. 4 is an enlarged cross-sectional view of a part A of FIG. 3.
Figure 5:
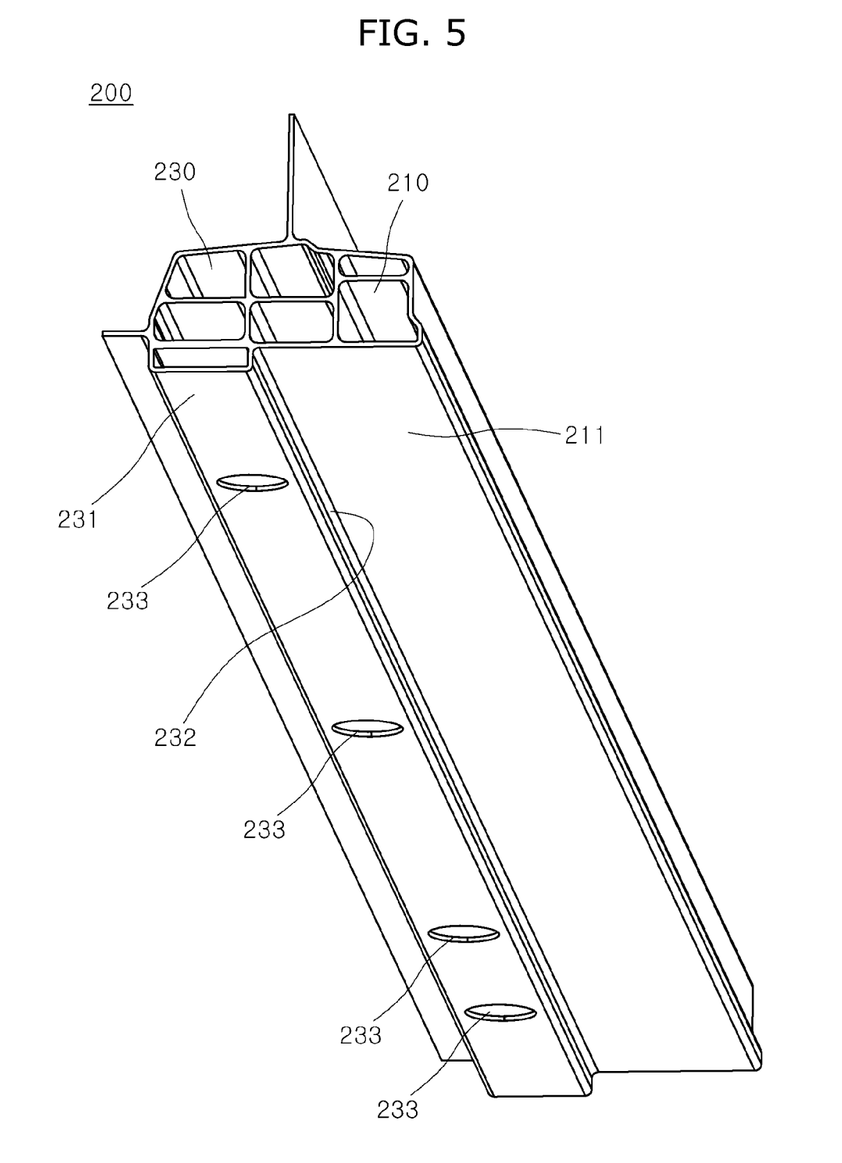
FIG. 5 is a perspective view of a vehicle body side sill section in accordance with the embodiment of the present disclosure.
Figure 6:
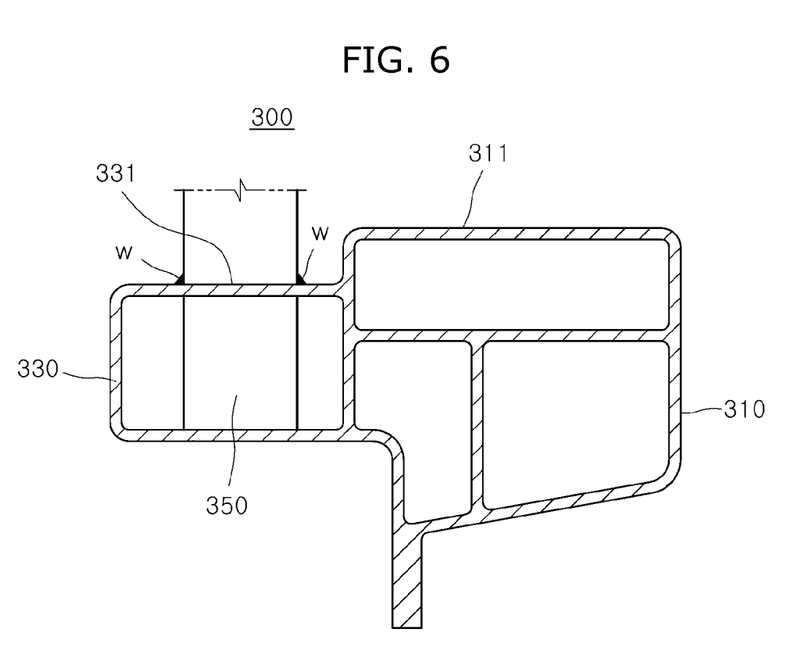
FIG. 6 is a cross-sectional view illustrating a side member section in accordance with the embodiment of the present disclosure.

FIG. 1 is a perspective view illustrating a vehicle body and a chassis frame to which a coupling structure of a vehicle body and a chassis frame in accordance with an embodiment of the present disclosure is applied, FIG. 2 is a perspective view illustrating a state in which the vehicle body and the chassis frame of FIG. 1 are coupled to each other, FIG. 3 is a cross-sectional view illustrating the coupling structure of a vehicle body and a chassis frame in accordance with the embodiment of the present disclosure, FIG. 4 is an enlarged cross-sectional view of a part A of FIG. 3, FIG. 5 is a perspective view of a vehicle body side sill section in accordance with the embodiment of the present disclosure, FIG. 6 is a cross-sectional view illustrating a side member section in accordance with the embodiment of the present disclosure, and FIG. 7 is a cross-sectional view illustrating a conventional side member.

Referring to FIGS. 1 to 6, a coupling structure 100 of a vehicle body and a chassis frame in accordance with an embodiment of the present disclosure includes a vehicle body side sill section 200 and a side member section 300.

The vehicle body side sill section 200 may be provided to a vehicle body 20 of a vehicle. In detail, the vehicle body side sill section 200 may be provided to the lower end of the vehicle body 20, and may extend in a front and rear direction of the vehicle.

The side member section 300 is provided to a chassis frame 30 which is coupled to the vehicle body 20, and is coupled to the vehicle body side sill section 200. A battery module 40 may be detachably mounted to the side member section 300.

The side member section 300 may be provided at a position corresponding to the vehicle body side sill section 200 so as to be coupled to the vehicle body side sill section 200. In detail, the chassis frame 30 may have a rectangular frame shape so that the battery module 40 is mounted therein, and the side member section 300 may be provided to extend in the front and rear direction of the vehicle and be coupled to each of both widthwise ends of the battery module 40.

Referring to FIGS. 3 to 6, the side member section 300 may include a side member body part 310 and a battery coupling part 330. The side member body part 310 may form the body of the side member section 300.

The battery coupling part 330 may be integrally formed with the side member body part 310, and a locking pipe 350 for locking the battery module 40 may pass through the battery coupling part 330. The battery coupling part 330 may be formed such that the upper surface of the battery coupling part 330 facing the vehicle body side sill section 200 has a height lower than the upper surface of the side member body part 310.

The battery coupling part 330 may be integrally fabricated with the side member body part 310 and be disposed in a direction toward the battery module 40 from the side member body part 310. The locking pipe 350 may pass through the battery coupling part 330 and be fastened by welding. When a direction toward the chassis frame 30 from the side member section 300 is defined as an upward direction, the upper surface of the battery coupling part 330 may be formed at a height lower than the upper surface of the side member body part 310. Due to this fact, it may be easy to weld the locking pipe 350 to the side member section 300.

In a state in which the locking pipe 350 passes through the battery coupling part 330, welding may be performed on the upper surface of the battery coupling part 330. Since the upper surface of the battery coupling part 330 is formed at a height lower than the upper surface of the side member body part 310, it is possible to prevent a phenomenon in which, when at least a part of the vehicle body side sill section 200 is seated on the side member body part 310, the vehicle body side sill section 200 is lifted from the side member section 300 due to the presence of a weld bead W.

By this fact, it is possible to solve a problem caused in the conventional art in that it is difficult to weld the locking pipe 350 to the side member section 300, whereby it is possible to improve the assemblability between the vehicle body 20 and the chassis frame 30.

The vehicle body side sill section 200 includes a side sill body part 210 and a locking part 230. The side sill body part 210, which forms the body of the vehicle body side sill section 200, is seated on the upper surface of the side member body part 310.

The locking part 230 is integrally formed with the side sill body part 210, and is provided with a locking nut part 250 to which a locking member B passing through the locking pipe 350 is to be locked. The locking part 230 is formed such that the lower surface of the locking part 230 facing the side member section 300 to be seated on the battery coupling part 330 has a height lower than the lower surface of the side sill body part 210.

The locking part 230 may be integrally fabricated with the side sill body part 210 and be disposed inward of the side sill body part 210. The locking nut part 250 may be formed in the locking part 230 such that the locking member B having passed through the battery module 40 and the side member section 300 is locked to the locking nut part 250. When a direction toward the side member section 300 from the locking part 230 is defined as a downward direction, the lower surface of the locking part 230 may be formed at a height lower than the lower surface of the side sill body part 210. That is to say, the height difference between the side sill body part 210 and the locking part 230 may correspond to the height difference between the side member body part 310 and the battery coupling part 330.

Due to this fact, as the locking part 230 is also seated on the side member section 300 together with the side sill body part 210, the contact area between the side member section 300 and the vehicle body side sill section 200 may be increased. Therefore, it is possible to increase the coupling strength between the side member section 300 and the vehicle body side sill section 200, and, as a cross-sectional area is increased in a coupling region, the torsional rigidity and bending rigidity of the vehicle may be increased.

According to the embodiment of the present disclosure described above, by improving the shape of the side member section 300, a welding space for welding the locking pipe 350 may be secured.

Also, according to the embodiment of the present disclosure, by improving the shape of vehicle body side sill section 200, it is possible to increase the contact area between the side member section 300 and the vehicle body side sill section 200 and increase a cross-sectional area in a coupling region. As a consequence, the torsional rigidity and bending rigidity of the entire vehicle may be increased, and thus, collision performance may be improved.

Describing the side member section 300 with reference to FIGS. 3, 4 and 6, the side member body part 310 may include a first seating surface 311 as a surface facing the vehicle body side sill section 200. The battery coupling part 330 may include a second seating surface 331 through which the locking pipe 350 passes and which is formed at a height lower than the first seating surface 311.

The side member body part 310 may further include a vertical seating surface 312 which is provided between the first seating surface 311 and the second seating surface 331 and extends perpendicularly to the first seating surface 311.

The upper surface of the side member section 300, which faces the vehicle body side sill section 200, may be formed to include the first seating surface 311, the second seating surface 331 and the vertical seating surface 312 so as to have a stepped shape. As the second seating surface 331 is formed at a height lower than the first seating surface 311, a welding space for welding the locking pipe 350 may be secured.

Describing the vehicle body side sill section 200 with reference to FIGS. 3 to 5, the side sill body part 210 may be provided toward the side member section 300, and may include a first adhesion surface 211 which is brought into contact with the first seating surface 311. The locking part 230 may include a second adhesion surface 231 which is formed at a height lower than the first adhesion surface 211 and is brought into contact with the second seating surface 331.

The locking part 230 may further include a vertical adhesion surface 232 which is provided between the first adhesion surface 211 and the second adhesion surface 231 and extends perpendicularly to the second adhesion surface 231.

The lower surface of the vehicle body side sill section 200, which faces the side member section 300, may be formed to include the first adhesion surface 211, the second adhesion surface 231 and the vertical adhesion surface 232 so as to have a stepped shape. As the second adhesion surface 231 is formed to be lower than the first adhesion surface 211, the vehicle body side sill section 200 may be formed to correspond to the shape of the side member section 300.

In other words, as the vehicle body side sill section 200 is added with the second adhesion surface 231 to correspond to the shape of the side member section 300, the cross-sectional area of the vehicle body side sill section 200 may be increased. As the cross-sectional area of the vehicle body side sill section 200 is increased in this way, the cross-sectional area of the entire coupling region between the side member section 300 and the vehicle body side sill section 200 may be increased, and thereby, the torsional rigidity and bending rigidity of the vehicle may be increased. Also, as the contact area between the side member section 300 and the vehicle body side sill section 200 is increased, the coupling strength therebetween may be increased.

In addition, when the side member section 300 and the vehicle body side sill section 200 are assembled, as the vertical seating surface 312 and the vertical adhesion surface 232 are brought into contact with each other, a load may be dispersed in the event of a side collision of the vehicle, and thereby, collision performance may be improved. In detail, the load applied to the side member section 300 in the event of a side collision may be dispersed by being transferred to the vehicle body side sill section 200 through the vertical seating surface 312 and the vertical adhesion surface 232 brought into contact with each other.

Referring to FIGS. 3 and 4, the embodiment of the present disclosure may further include an adhesion section 500 which is formed by applying an adhesive between the vehicle body side sill section 200 and the side member section 300.

The adhesion section 500 may include a first adhesion part 510 which is formed between the first seating surface 311 and the first adhesion surface 211, a second adhesion part 520 which is formed between the second seating surface 331 and the second adhesion surface 231, and a third adhesion part 530 which is formed between the vertical seating surface 312 and the vertical adhesion surface 232.

In detail, as the vehicle body side sill section 200 is formed to correspond to the shape of the side member section 300 and thus the contact area therebetween is increased, the adhesive may be additionally applied to an increased contact region. Namely, in addition to between the first seating surface 311 and the first adhesion surface 211, the adhesive may also be applied between the second seating surface 331 and the second adhesion surface 231 and between the vertical seating surface 312 and the vertical adhesion surface 232.

Accordingly, the adhesion strength between the vehicle body side sill section 200 and the side member section 300 may be increased. Moreover, due to this fact, the lifting space between the vehicle body side sill section 200 and the side member section 300 may be reduced, and thus, the number of joints needed between the vehicle body side sill section 200 and the side member section 300 may be reduced.

The upper end of the locking pipe 350 may be provided to protrude out of the second adhesion surface 231, and the locking part 230 may further include a pipe passage hole 233 which is formed through the second adhesion surface 231 to allow the locking pipe 350 to pass therethrough.

According to this fact, when the vehicle body side sill section 200 and the side member section 300 are assembled, the locking pipe 350 may be inserted through the pipe passage hole 233 to define an assembly position between the vehicle body side sill section 200 and the side member section 300. Therefore, it is possible to prevent the occurrence of a fluctuation between the vehicle body side sill section 200 and the side member section 300 upon assembly, and thus, assemblability may be improved.

The pipe passage hole 233 may be formed to have a size larger than the outer diameter of the locking pipe 350. By this fact, it is possible to prevent a lifting phenomenon between the second adhesion surface 231 and the second seating surface 331.

In detail, after the locking pipe 350 passes through the second seating surface 331, welding for fastening the locking pipe 350 to the second seating surface 331 may be performed. In this case, the weld bead W may be formed on the outer surface of the locking pipe 350 and the second seating surface 331 around the locking pipe 350.

The pipe passage hole 233 may be formed to have a size larger than the outer diameter of the locking pipe 350 so as to accommodate a region where the weld bead W is formed. That is to say, the diameter of the pipe passage hole 233 may be larger than the diameter of the outer surface of the locking pipe 350, and the difference therebetween may be determined in consideration of the size of the weld bead W.

As is apparent from the above description, according to the embodiments of the present disclosure, by improving the shape of a side member section, it is possible to secure a welding space for welding a locking pipe.

Also, according to the embodiments of the present disclosure, by improving the shape of a vehicle body side sill section, it is possible to increase a contact area between the side member section and the vehicle body side sill section and increase a cross-sectional area in a coupling region. As a consequence, the torsional rigidity and bending rigidity of an entire vehicle may be increased, and thus, collision performance may be improved.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A coupling structure of a vehicle body and a chassis frame, comprising:

a vehicle body side sill section disposed in the vehicle body of a vehicle; and a side member section disposed in a chassis frame coupled to the vehicle body, coupled to the vehicle body side sill section, and having a battery module mounted thereto, wherein the side member section includes a side member body part, a battery coupling part which is integrally formed with the side member body part, and a locking pipe passing through the battery coupling part for locking the battery module, wherein an upper surface of the battery coupling part facing the vehicle body side sill section is formed at a height lower than an upper surface of the side member body part, and wherein the vehicle body side sill section includes a side sill body part which is seated on the upper surface of the side member body part, a locking part which is integrally formed with the side sill body part, and a locking nut part configured to lock a locking member passing through the locking pipe, wherein a lower surface of the locking part facing the side member section to be seated on the battery coupling part is formed at a height lower than a lower surface of the side sill body part.

2. The coupling structure according to claim 1, wherein the side member body part includes a first seating surface as a surface facing the vehicle body side sill section, and the battery coupling part includes a second seating surface through which the locking pipe passes and which is formed at a height lower than the first seating surface.

3. The coupling structure according to claim 2, wherein the side sill body part includes a first adhesion surface facing the side member section and is brought into contact with the first seating surface, and the locking part includes a second adhesion surface which is formed at a height lower than the first adhesion surface and is brought into contact with the second seating surface.

4. The coupling structure according to claim 3, wherein the side member body part further includes a vertical seating surface which is arranged between the first seating surface and the second seating surface and extends perpendicularly to the first seating surface, and the locking part further includes a vertical adhesion surface which is arranged between the first adhesion surface and the second adhesion surface and extends perpendicularly to the second adhesion surface.

5. The coupling structure according to claim 4, further comprising:

an adhesion section including an adhesive and arranged between the vehicle body side sill section and the side member section, wherein the adhesion section comprises:

a first adhesion part arranged between the first seating surface and the first adhesion surface;

a second adhesion part arranged between the second seating surface and the second adhesion surface; and a third adhesion part arranged between the vertical seating surface and the vertical adhesion surface.

6. The coupling structure according to claim 3, wherein an upper end of the locking pipe is formed to protrude out of the second adhesion surface, and the locking part further includes a pipe passage hole which is formed through the second adhesion surface to allow the locking pipe to pass therethrough.

7. The coupling structure according to claim 6, wherein the pipe passage hole is formed to have a size larger than an outer diameter of the locking pipe.

\* \* \* \* \*